G. WILKINSON.
Cultivator.
No. 166,050. Patented July 27, 1875.
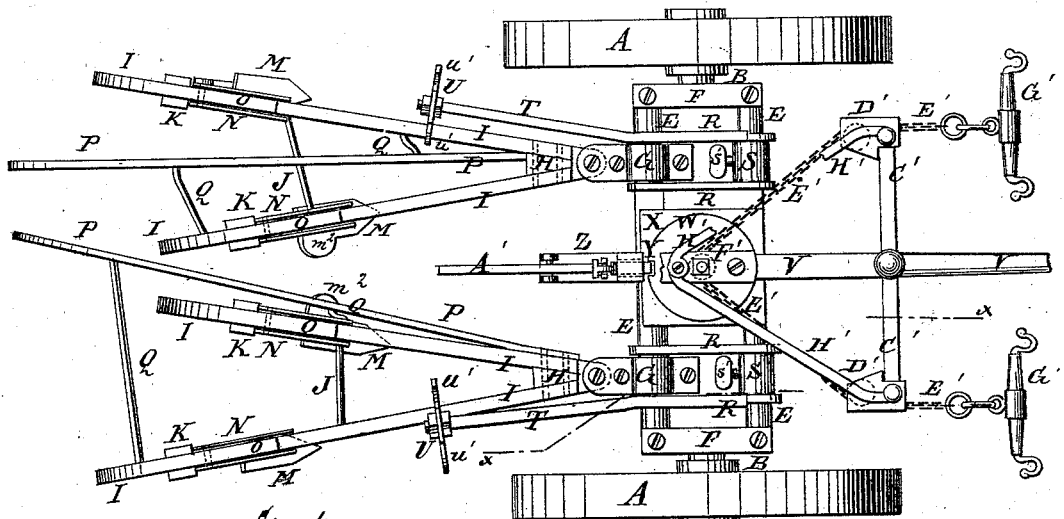
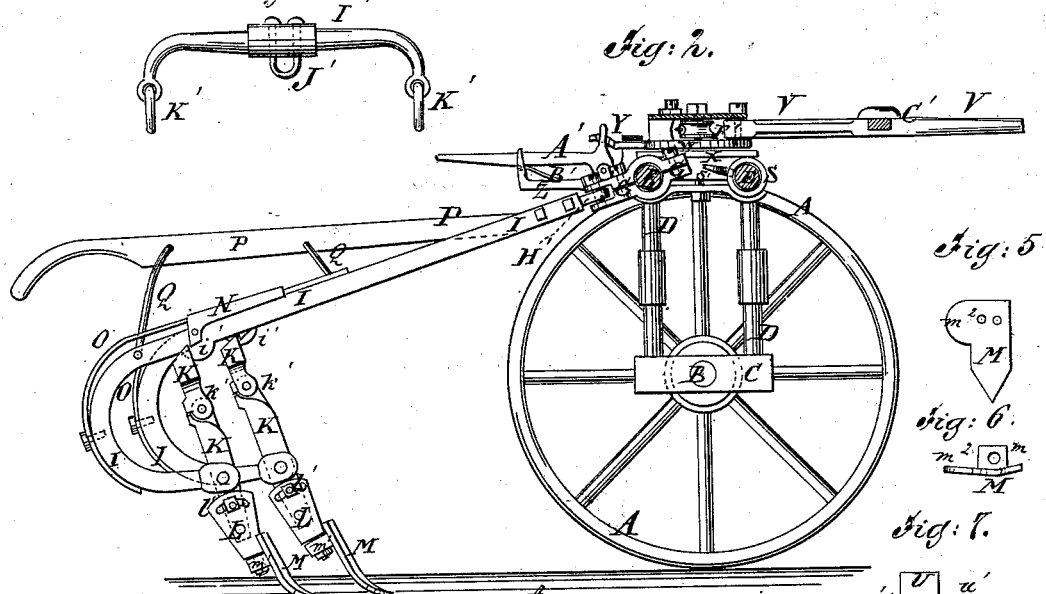
WITNESSES:
INVENTOR:
Gershom Wilkison
BY
ATTORNEYS.

UNITED STATES PATENT OFFICE.

GERSHOM WILKINSON, OF QUINCY, OHIO.

IMPROVEMENT IN CULTIVATORS.

Specification forming part of Letters Patent No. 166,050, dated July 27, 1875; application filed April 17, 1875.

*To all whom it may concern:*

Be it known that I, GERSHOM WILKINSON, of Quincy, in the county of Logan and State of Ohio, have invented a new and useful Improvement in Cultivator, of which the following is a specification:

Figure 1 is a top view of my improved cultivator. Fig. 2 is a side view of the same, partly in section through the line $x\ x$, Fig. 1. Fig. 3 is a detail side view of the rear part of one of the plow-beams and its attachments. Fig. 4 is a detail view of the neck-yoke. Fig. 5 is a detail front view of one of the hilling shovel-plows. Fig. 6 is a top end view of the same. Fig. 7 is a detail view of one of the adjustable plow-holders.

Similar letters of reference indicate corresponding parts.

The invention will first be described in connection with drawing, and then pointed out in the claims.

A are the wheels, which revolve upon the axle-arms B. The inner ends of the axle-arms B are rigidly attached to short horizontal cross-bars C', to the ends of which are attached the lower ends of the uprights D.

To the upper end of the uprights D are attached the ends of the two cross-bars E, and also the end of the two short longitudinal bars F. In this way a double-arched frame is formed, which enables the machine to pass over the plants without injuring them.

Upon the end parts of the rear cross-bar E are placed two bearings, G, each of which is made in two parts, bolted to each other. The rear ends of the parts of the bearings G project, and have a horizontal notch formed in them to receive the forward end of the block H, which is pivoted in said notch by a bolt.

To the opposite sides of each of the blocks H is bolted the forward ends of two plow-beams, I, which incline from each other as they extend to the rearward, and are held at the proper distance apart by cross-bars J, as shown in Fig. 1. The inner plow-beam of each pair is made shorter than the outer one, to bring the inner plow to the proper distance in front of the outer one. The rear ends of the plow-beams I are bent downward into U-shape, as shown in Figs. 2 and 3, and to them are pivoted the standards K.

To the opposite sides of the lower end of the standards K are pivoted two plates, L, to the lower ends of which is attached a bolt, which passes through an eye, $m^1$, formed upon or attached to the rear side of the shovels M, which shovels are secured in place by nuts screwed upon the lower ends of the said bolts. The upper parts of the plates L are made wide, and have curved slots formed through them to receive the bolts $l'$ which pass through the standards K, so that by loosening the nuts of the said bolts the pitch of the plows M may be adjusted to cause said plows to work deeper or shallower in the ground, as may be desired.

Upon the upper part of the inner edge of the inner plows M are formed semicircular projections or wings $m^2$, to throw soil around the plants or hill them.

In the upper part of the standards K is formed a knee-joint, $k'$, so formed that the upper part of the said standards may swing forward a little, but cannot swing backward.

The upper end of the standards K is notched to receive a short rib, $i$, formed upon the under side of the beams I, to hold the upper end of the said standards from lateral movement.

The forward side of the upper end of the standards K rest against the rear side of the end of the short arms of the elbow-levers N, which are pivoted to the plow-beams I. The lower arms of the levers N are notched or slotted to straddle the beams I, and project a little below said beams. The long arms of the levers N project forward along the upper side of the beams I, and are grooved longitudinally to receive the forward part of the springs O, the rear parts of which are curved to pass around the bends of the beams I, and are secured to said bends, as shown in Figs. 2 and 3.

By this construction, should the plows M strike an obstruction, the upper ends of the standards K will be forced forward, raising the lever N into the position shown in Fig. 3, and allowing the plows to swing back, so as to pass the obstruction. When the upper end of the standards K is drawn back, the joint $k'$ will yield and allow the said standards to pass the levers N.

P are the handles, the forward ends of which are secured to the forward parts of the plow-beams I. The rear parts of the handles P are inclined to one side, so that the plowman can walk at the side of the row of plants being cultivated, and are supported in proper position by braces Q, the lower ends of which are attached to the plow-beams I.

R are two pairs of bars, which have holes in their ends to fit upon the cross-rods E. The forward ends of the bars R of each pair are rigidly attached to a short tube which fits upon the forward cross-bar E, is of a length equal to the width of the bearings G, and is provided with a set-screw, $s'$, to enable the bars R and tubes S to be readily secured in place when adjusted. The bearings G are placed upon the rear cross-rod E, between the rear ends of the bars R, so that the plows may be adjusted wider apart and closer together, by adjusting the positions of the bars R and tubes S. To the outer bar R of each pair is attached the forward end of a bar or lever, T, upon the rear end of which is placed a slotted plate, U, secured in place by a nut. The plates U have hooks $u'$ upon their side edges, turned in opposite directions, as shown in Fig. 7. When the plates U are in the position shown in Fig. 7, by loosening the clamping-nut they may be raised to support the plows farther from the ground, and, by inverting the plates, which brings the other hooks into working position, they may be lowered to support the plows at a less distance from the ground. V is the tongue, the rear end of which is secured in a socket formed upon or attached to the upper side of a circular disk or wheel, W, which is pivoted at its center to a plate or bar, X, attached to the centers of the cross-bars E. The tongue V is locked in line with the length of the machine by a bolt, Y, the forward end of which enters a notch in the edge of the disk W, and which works in a socket attached to the arm Z. The arm Z is attached to the center of the rear cross-bar E, projects to the rearward, and its rear end is bent upward and slotted to receive the lever $A'$ and keep it in place. The lever $A'$ has a cross-head formed upon its forward end, the lower arm of which is pivoted to the forward part of the arm Z. The upper arm of the cross-head of the lever $A'$ is slotted to receive a neck formed upon the rear end of the bolt Y, so that the said bolt Y may be operated by operating the lever $A'$. The rear end of the lever $A'$ is held up, holding the bolt Y pressed forward against the disk W by a spring, $B'$, attached to the arm Z, and which bears against the under side of the rear part of the said lever $A'$. By this construction, by pressing down upon the lever $A'$, the disk W will be released, so that the machine may run in a different direction from the direction of the tongue, which makes it very convenient in turning at the ends of the rows, the end of the bolt Y resting against the edge of the disk W and springing into its notch when the machine again comes into line with the tongue. To the tongue V, a little in front of its rear end, is rigidly attached a cross-bar, $C'$, to the ends of which are attached guide or socket blocks, in which are pivoted pulleys $D'$, around which passes the draft-chain $E'$, which also passes around a pulley, $F'$, pivoted to the bolt that pivots the disk W to its support. To the ends of the chain $E'$, at the forward side of the ends of the cross-bar $C'$, are attached the single-trees $G'$, to which the draft is attached. The cross-bar $C'$ and the tongue V are strengthened against the draft-strain by the V-brace $H'$, the ends of which are bolted to the ends of the rigid cross-bar $C'$, and the angle of which is bolted to the disk W, or to a projection or socket formed upon or attached to said disk. $I'$ is the neck-yoke, which is designed to be placed beneath the tongue instead of above it, the usual way, and which has a staple, $J'$, attached to its upper side to receive the end of the tongue and keep it in place. The ends of the neck-yoke $I'$ are bent upward and are provided with rings $K'$ to receive the neck-yoke straps. The upward curve of the ends of the neck-yoke prevent the lines and straps of the harness from catching upon the said ends.

Having thus described my invention, I claim as new and desire to secure by Letters Patent—

1. The combination of the pivoted and jointed standards K, the elbow-levers N, and the springs O, with the curved rear parts of the plow-beams I, substantially as herein shown and described.

2. The combination of the pivoted and slotted plates L with the standards K and the plows M, substantially as herein shown and described.

3. The combination of the levers or arms T and the adjustable hook-plates U $u'$, with the outer adjusting-bars R, substantially as herein shown and described.

GERSHOM WILKINSON.

Witnesses:
 JOHN M. NUTT,
 JNO. BELL.